United States Patent [19]

Baker

[11] 4,210,068
[45] Jul. 1, 1980

[54] BAG SEALER LID ASSEMBLY

[75] Inventor: Fred E. Baker, Asheboro, N.C.

[73] Assignee: General Electric Company, New York, N.Y.

[21] Appl. No.: 13,025

[22] Filed: Feb. 21, 1979

[51] Int. Cl.² .................... B31B 1/64; E05D 11/10
[52] U.S. Cl. ..................................... 93/8 R; 16/147;
156/583.9; 220/335; 93/DIG. 1
[58] Field of Search .............. 93/33 H, DIG. 1, 8 R;
16/147, 86 C, 85, 173, DIG. 13; 220/335;
156/583.8, 583.9, 510

[56] References Cited

U.S. PATENT DOCUMENTS

| | | | |
|---|---|---|---|
| 2,268,942 | 1/1942 | Jacobs | 16/85 |
| 2,271,135 | 1/1942 | Crebbs | 220/335 X |
| 2,712,149 | 7/1955 | Harms | 16/85 |
| 3,152,716 | 10/1964 | Feldhahn | 16/147 X |
| 3,378,880 | 4/1968 | Haldopoulos et al. | 16/142 |
| 3,847,712 | 11/1974 | Hubbard | 156/583.9 X |
| 3,972,090 | 8/1976 | Holmes | 16/139 |
| 4,021,290 | 5/1977 | Smith | 156/583.9 X |
| 4,093,500 | 6/1978 | Browne | 156/583.9 X |
| 4,104,108 | 8/1978 | Kishida et al. | 156/583.9 X |
| 4,156,382 | 5/1979 | Baker | 83/455 X |

*Primary Examiner*—James F. Coan
*Attorney, Agent, or Firm*—John F. Cullen; George R. Powers; Leonard J. Platt

[57] ABSTRACT

In a home bag sealer of an integral molded and elongated box housing having an opening for supporting a roll of bag material with a rear pivoted lid on the housing to close the opening and, with a heater along the opening operative on lid closing to seal a selected size bag, there is provided an improvement in the lid assembly of a wall at each end of the opening with a bearing aperture in each wall adjacent the opening at the pivot axis. A flat wall encloses the remaining surface of the housing around the opening and an elongated slot is provided in the flat wall adjacent and parallel to each end wall opposite the opening. A sized projection is provided on at least one, and preferably both, end walls extending away from the opening and offset forward of the apertures and a pair of axially flexible spaced bell-cranks is integrally molded to the lid with a free arm directed to the rear of the lid and spaced so that the arms snugly enter the slots with each arm end having a pivot directed towards and received in the apertures for pivoting the lid. The arrangement is such that the cranks are biased or spread apart temporarily to enter the slots and apertures and block the lid open by the projection contacting an arm to prevent pivoting. The lid is closed by rotation to temporarily spread the cranks axially to ride over the projections as the arms enter the slots. The entire assembly comprises only two molded pieces one piece being the box housing, walls, slots, bearings, and projections and the second molding comprising the lid, bellcranks, and pivots so that the two-piece structure provides all the hinging and lid-holding functions.

3 Claims, 4 Drawing Figures

BAG SEALER LID ASSEMBLY

BACKGROUND OF THE INVENTION

1. Field of the Invention

The invention herein pertains to a lidded box-like home bag sealer which seals a polyethylene bag by pressing a lid against a resistance wire heater on the box that uses either standard selected bags or preferably a roll of bag material that may be unrolled over the heater and the bag cut to any selected size. The invention resides in an improved lid assembly for the lid to be retained in an open position as the bag material is measured out.

2. Description of the Prior Art

Home bag sealers are well known for various household chores such as sealing leftovers to retain the nutrients and juices and for many other uses. Development of the boilable plastic bag in which food may remain sealed in the bag so that it may be dropped directly into boiling water has come into use and is available. Such bags that withstand cooking temperatures usually are of a polyethylene inner liner with a separate outer liner of a higher temperature resisting plastic layer so that the two-part bag may be sealed to the polyethylene with the outer tougher material protecting against boiling temperatures when placed in boiling water. Generally the bags may be separate and hung on pegs on the bag sealer or may comprise a roll carried in the bag sealer that is pulled out to make any selected size bag desired merely by closing the lid to fuse the plastic and seal the surfaces along the heater between the lid and box. Additionally, cutting means may simultaneously cut near the sealed area or may comprise a separate razor slidable lengthwise of the lid to cut the bag to a selected size. A typical useful arrangement is shown in applicant's copending application Ser. No. 862,522 (6D-5089) filed Dec. 20, 1977, now U.S. Pat. No. 4,156,382 of common assignment which is directed to an improved cutting arrangement for the bag.

SUMMARY OF THE INVENTION

Briefly described, the invention is directed to a home bag sealer of an integral molded elongated box housing with an opening for supporting a roll of bag material and a rear pivoted lid on the housing to close over the opening and having a heater along the opening operative on lid closing to seal the bag. To this known combination, the invention provides an improvement in the lid assembly of a wall at each end of the opening with a bearing aperture in each wall adjacent the opening at the pivot axis and a flat front or top wall encloses the upper surface of the housing around the opening. An elongated slot is provided in the flat wall adjacent and parallel to each end wall on the side opposite the opening and sized projection means like a dimple, is provided, preferably on each end wall, projecting away from the opening and offset forward of the apertures for holding the lid. The lid has a pair of spaced bellcranks that are flexible in the axial direction and have a free arm directed to the rear of the lid with the arms snugly entering the slots. A pivot is provided on each arm and is directed towards the apertures and received therein forming a pivot axis for the lid. The entire assembly is a two-part molded structure whereby the cranks are biased apart to enter the slots and apertures to block the lid open by contact between the projection means and each free arm to prevent pivoting. The lid is closed by rotation to temporarily spread the flexible cranks axially to ride over the projecting dimple means as the arms enter the slots. Thus, the main object of the inventuon is to provide an improved bag sealer lid assembly such that only two molded plastic parts comprise the entire sealer with the two-part construction performing all the hinging and lid-holding functions.

DESCRIPTION OF THE PREFERRED EMBODIMENT

Figure 1:
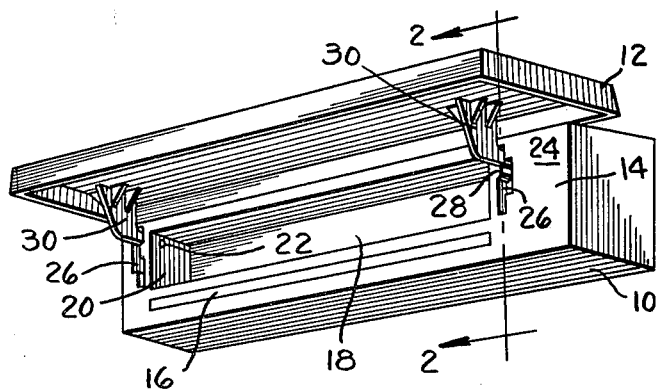
FIG. 1 is a perspective view of a bag sealer with the lid held in open position.

Referring to FIG. 1, there is shown a typical home bag sealer of a known type that uses a lidded elongated box 10 for making and heat sealing flexible plastic bags for many household uses. Box 10 is provided with a hinged lid 12 and contains internal electrical mechanism, not shown, at one end 14 which, upon pressure on lid 12, heats an electrical element in the form of a heater such as a resistance wire heater 16 along the lid opening area with the lid operative to actuate the heating mechanism by operating a switch, not shown, as the lid is pivoted closed over opening 18.

Various selected sizes of plastic bags may be formed from a suitable roll of bag material carried in opening 18 and which is dispensed by pulling it out the front of box 10 to any suitable length desired as well known. The selected bag is sealed by closing the lid 12 and applying pressure against heater 16 which fuses the material to whatever selected length is desired. Such material may then be cut by a structure shown in the copending application Ser. No. 862,522 (6D-5089) supra.

Figure 3:
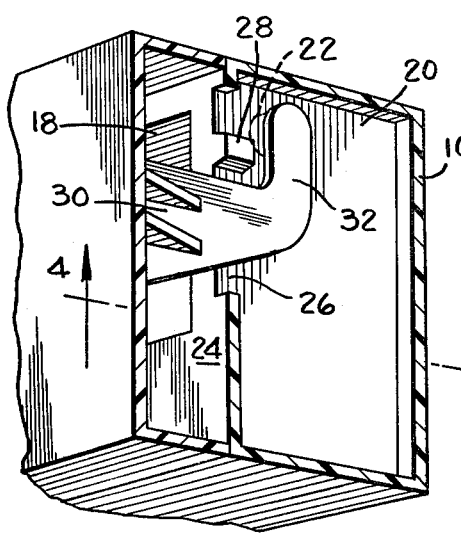
FIG. 3 is a view, similar to FIG. 2, with the lid in closed position.
Figure 2:
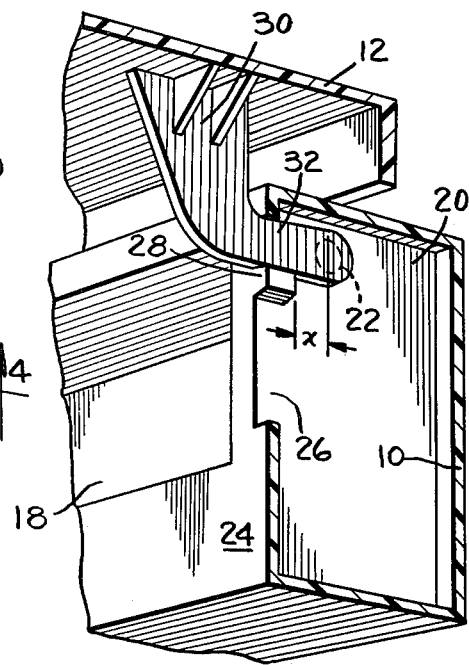
FIG. 2 is an enlarged partial sectional perspective on line 2—2 of FIG. 1.

Such home bag sealers are all very similar taking the form of an elongated molded box housing 10 and a correspondingly elongated opening 18 for the roll of bag material. The sealer may be rested flat on the counter or conveniently mounted on a wall by a well known key slot fitting over a screw head at each end of the elongated housing so that it is vertically mounted as shown in FIG. 1. With this arrangement, the lid is opened and the bag material is pulled out to the selected length and then the lid closed to seal the bag after which it is cut. When the wall mount is used it is desirable to have the lid remain open hands-free as the bag material is dispensed. Many types of stop mechanism can be used to retain the lid in open position but simplicity is required in assembly, hinging, and lid-holding functions all without the use of complex many-parts structure. In accordance with the invention, a simple two-piece structure includes a pair of spaced end walls 20 at each end of bag opening 18 with each wall having a bearing aperture 22 formed therein adjacent the opening at the pivot axis of the lid. Completing the housing 10 there is provided a flat front wall 24 to enclose the remaining or, as shown, front surface of the housing around opening 18. To accommodate pivoting structure, wall 24 is provided with an elongated slot 26 formed directly in the front wall adjacent and parallel to each end wall 20 and on the opposite side of the wall from that of opening 18 as shown in FIGS. 2 and 3. For a lid-holding function, a pair of sized projections 28, much like a dimple and sized to be overridden, are provided on at least one end wall 20 and preferably on both as shown in FIG. 1 with the projections extending away from opening 18 and being offset forward from the center of apertures 22 by an amount x as shown in FIG. 2. The lid is provided with a pair of axially spaced bellcranks 20 that may form a part of the lid molding, each bellcrank having a free arm 32 directed towards the rear of the lid as seen in FIG. 2. The bellcranks 30 are axially spaced so that the arms 32 snugly enter their respective slots 26 rubbing against the slots. For lid rotation, each arm is provided with a pivot 34 formed thereon, the pivot being directed towards the opening 18 and received in its respective aperture 22 so that the lid pivots around an axis through bearing/pivot 22, 34. While a single stop projection 28 on one end wall will hold the lid open, a projection at each end of the elongated housing extending opposite to one another is preferred.

Figure 4:
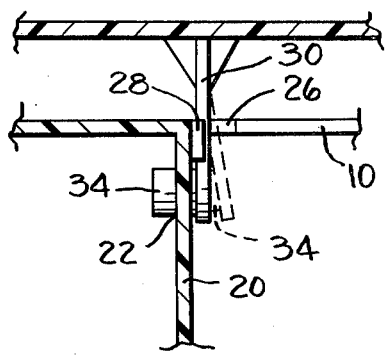
FIG. 4 is a partial sectional on line 4—4 of FIG. 3 showing the flexing of the bellcrank arms.

The arrangement of parts is such that the bellcranks 30 are flexibly and axially biased to spread apart for assembly when the lid structure is attached as shown in FIG. 4 by the pivot 34 snapping into bearing aperture 22 to pivotally secure the lid to the box housing. With the lid in open position as shown in FIG. 2, the arms 32 ride in slots 26 around pivot 22/34 and the lid is blocked open by projection 28 contacting the side of arm 32 to prevent pivoting and lock the lid in the open position as shown in FIGS. 1 and 2. To close the lid it is merely necessary to rotate it downwardly in FIG. 1 to temporarily spread the axially flexible bellcranks 30 permitting them to ride over the projection 28 when the arms 32 again snap back into the main portion of slot 26 below projection 28 rotating the lid closed as shown in FIG. 2. The pivot 34 is sufficiently long that it does not leave the bearing aperture 22 but merely slides in it as shown in FIG. 4.

From the above structure it will be seen that the entire bag sealer is essentially a two-part plastic structure wherein the housing 10, walls 20 and 24, slots 26, bearing apertures 22 and projections 28 are all one integral plastic molding while the lid 12, bellcranks 20, free arms 32 and pivots 34 are a second and integral plastic molding permitting freedom of axial movement of arms 32 for flexing and accommodating tolerances in molding.

Thus, the arrangement provides a simple substantially only two-piece molding for a home bag sealer that provides all of the requirements of low cost, easy assembly, with only two parts to provide all hinging and lid-holding functions.

While I have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. In a home bag sealer of an integral molded elongated box housing with an opening for supporting a roll of bag material and a rear pivoted lid on the housing to close the opening, a heater along the opening operative on lid closing to seal a bag, the improvement in the lid assembly comprising,
   a wall at each end of the opening,
   a bearing aperture in each wall adjacent the opening at the pivot axis,
   a flat front wall enclosing the upper surface of the housing around the opening,
   an elongated slot in the flat wall adjacent and parallel to each end wall opposite the opening,
   sized means on an end wall projecting away from the opening and offset of said apertures,
   a pair of axially flexible spaced bellcranks connected to the lid with a free arm directed to the rear thereof and spaced for said arms to snugly enter said slots, and
   a pivot on each arm end directed towards and received in said apertures to pivot the lid,
   whereby the cranks are biased apart to enter the slots and apertures to block the lid open by the sized projection means contacting an arm preventing pivoting, the lid being closed by rotation, temporarily spreading the cranks axially to ride over the projecting means as the arms enter the slots.

2. Apparatus as described in claim 1 wherein a sized projection means is disposed on each end wall with the means extending opposite one another away from the opening.

3. Apparatus as described in claim 2 wherein the elongated box housing, walls, slots, bearings, and projections are one integral plastic molding, and
   the lid, bellcranks, and pivots are a second integral plastic molding,
   to provide a two-part construction performing all hinging and lid-holding functions.

* * * * *